Patented Mar. 29, 1949

2,465,520

UNITED STATES PATENT OFFICE 2,465,520

TEXTILE TREATMENT WITH ALKALI-ZINC-ATE SOLUTIONS OF CELLULOSE ETHERS

Sidney M. Edelstein, Elizabeth, N. J.

No Drawing. Application December 13, 1943,
Serial No. 514,163

1 Claim. (Cl. 8—115.6)

This invention relates to treatment of textile material. More particularly the invention relates to the treatment of textile materials with alkali zincate solutions of cellulose ether.

The application is a continuation in part of the following applications for United States Patents: Serial No. 483,817, now Patent No. 2,357,-731, filed by me on April 20, 1943, and entitled Solubilized cellulose and method of making; and Serial No. 507,731 now abandoned, filed by me on October 26, 1943, and entitled Zincate treatment of regenerated cellulose.

Certain cellulose ether solutions in alkali are at present in extensive use in the treatment of textile materials, to provide a coating thereon of cellulose ether. The dissolving of the cellulose ether in sodium hydroxide or like alkali metal hydroxide solution is effected with cooling, the extent of the cooling required depending in part on the degree of substitution of the alkoxy or ether groups in the cellulose molecule.

I have now discovered that the cellulose ethers may be dissolved in sodium zincate solution, without cooling to temperatures as low as required for dissolving a given ether in alkali metal hydroxide solution. Furthermore, the viscosity of the cellulose ether solutions in sodium zincate are substantially higher than the viscosities of comparable solutions in alkali metal hydroxide, in spite of the fact that I have found the zincate a much better solvent than the hydroxide for the cellulose ethers. This increase of viscosity of the zincate solutions is desirable in decreasing the settling of pigments which are often suspended in the coating solution and thus facilitating the even and controlled application of color by means of pigments to textile materials. Also, the use of zincate in place of alkali metal hydroxide solution as the medium for dissolving the cellulose ethers permits of the use of eithers of lower degree of etherification than are possible when an alkali metal hydroxide solution is used as the solvent.

Briefly stated, the invention comprises the treatment of a textile material with the zincate solution of a cellulose ether and the improved product resulting from such treatment, the treatment including applying the cellulose ether solution to the textile material and then precipitating the cellulose ether upon the textile material.

A number of advantages of the process and products of the invention have been stated above. There are additional advantages. Fabrics treated with the zincate solutions of the cellulose ethers show more stiffness and greater fastness of the precipitated cellulose ether upon the fabric than is obtained when the ether is applied in an alkali metal hydroxide solution. In addition, the zincate used as the solvent medium has the power of swelling and dissolving the surface portions of textile meterial, especially rayon of other regenerated cellulose fabric, the material so dissolved being precipitated later, at the same time that the cellulose ether is precipitated from the adhering film of the zincate solution, so that the initially dissolved surface portions and the precipitated ether become firmly united in what amounts practically to an integral structure. As compared to solutions of cellulose in sodium zincate solution, the zincate solutions of the cellulose ether are more nearly clear and show less sediment on long standing with practically no tendency to set up to a gel on aging.

In general, the method of making the solutions of the present invention comprises dispersing the selected cellulose ether in a solution of an alkali metal zincate and maintaing the dispersion until the cellulose ether is substantially completely dissolved, alkali metal hydroxide being in excess in the zincate.

It is convenient and preferred first to wet the cellulose ether with a portion of the water that is to be present in the final solution, as by slurrying the cellulose ether with about 5 to 10 times its weight of water. In this preferred method, the solution of alkali metal zincate, of concentration in excess of that desired in the final solution, is then introduced, the whole stirred, and then the remainder of the water is added. The addition of the remainder of the water may be made gradually, in any convenient manner, as by flowing in the water in a small stream as the mixture is stirred or by the addition of the calculated quantity of cracked ice which, in melting, gives the water of dilution which is desired.

The ice if used effects cooling also.

It should be emphasized, however, that cooling is not required with the forms of cellulose ether that may be dissolved in alkali metal hydroxide solutions at temperatures of 0° C. or higher. With such cellulose ethers, my process gives good solutions at room temperatures, in summer or winter. With other cellulose ethers of lower degree of etherification, that is of lower degree of substitution of alkoxy groups in place of hydroxyls in the cellulose molecule, lower temperatures are helpful in effecting quick solution by my process. Thus, with cellulose ethers of degree of substitution requiring a temperature of —15° C. for satisfactory quick solution in aqueous sodium hydroxide, I use to advantage about 0° C. as the temperature for effecting solution in my zincate solution.

The time required to effect the solution is short. Ordinarily a few minutes stirring after the addition of the full amounts of all of the components of the finished solution is adequate to produce what appears to be and what remains a practically clear stable solution of the cellulose ether in the aqueous sodium zincate.

The proportions of water, alkali metal hydroxide, and zinc oxide used in making the sodium zincate solution constituting the final solvent medium for the cellulose ether may be those described in United States Patent 2,322,427 issued to me on June 22, 1943, and entitled Cellulose product, or described in either of the said copending applications. Thus, I may use a solution made from 8 to 15 parts of sodium hydroxide, 2 parts to the saturation proportion of zinc oxide, and 100 parts of water.

The proportion of the cellulose ether dissolved in the alkali metal zincate solution is ordinarily about 1 to 8 parts for 100 of total solution. For most uses the concentration and the viscosity of the finished solution are about right when the proportion of the cellulose ether is 3 to 6 parts for 100 parts of the solution.

The ether used in an alkali stable and preferably water insoluble cellulose ether as, for example, the methyl ether of degree of substitution less than 1.2, ethyl ether of d. s. less than 0.8, hydroxyethyl or other hydroxyalkyl ether of d. s. less than 1.3, carboxymethyl cellulose of d. s. less than 0.3.

The alkoxy content, the measure of the degree of etherification, is expressed in terms of the number of alkoxy groups substituted in the cellulose molecule for each glucose ($C_6$) unit of the cellulose molecule and is called the degree of substitution sometimes abbreviated "d. s."

The invention makes possible the use of a wide range of ethers as classified by the degree of substitution and makes possible the convenient dissolving not only of ethers that are soluble in caustic alkalies but also of ethers of such low degree of substitution down to 0.1 as to be impracticable for use commercially in making solutions of the ether in such alkalies.

In place of the water insoluble ethers, there may be used water soluble ethers such as the cellulose ethers of kind described, without any limitation as to the maximum degree of substitution. With such water soluble material, however, the advantages gained by the use of alkali metal zincate are not as great as with the water insoluble ethers.

The zincate which is used as the solvent medium is an aqueous solution of an alkali metal zincate. There is no advantage in using the more rare alkali metals in this composition. Either sodium or potassium zincate is satisfactory. The sodium zincate is preferred because of the lesser cost of sodium salts as compared to potassium salts.

Once the zincate solution of the cellulose ether has been applied to a textile material and the excess of solution has been removed, so as to leave an adhering film of the solution, then the cellulose ether is precipitated from the film upon the textile material. The precipitation may be made as described, for instance, in the said copending applications or the said issued patent. Thus, the precipitation may be effected by acidification, adding an electrolyte to give a high concentration of dissolved electrolyte, heating, or extreme dilution with water, alcohol, or other liquid that when mixed with a large proportion of water is a non-solvent for the cellulose ether.

After the textile is thus provided with a coating of precipitated cellulose ether, the product may be washed and dried. For some purposes the washing is omitted or purposely made imperfect. Also, the washing may be preceded by treatment with an aqueous solution of an alkali, of which a dilute solution of sodium carbonate, potassium carbonate, or sodium hydroxide is satisfactory.

Ordinarily the washing, as practiced by me and if used at all, is not adequate to remove all of the zinc compound so that some zinc compound remains in the finally treated textile material. Thus, amounts up to 1% of remaining zinc are not uncommon. Such retained zinc decreases the lustre when the textile material originally selected for the treatment is a rayon and increases the fastness to dyes and to pigments of textile materials that ordinarily are not satisfactory in fastness to these classes of coloring materials. Alkali treatment before washing increases the proportion of the zinc compound retained in the coating.

In addition to the use of the cellulose ether solution in coating of textiles, the zincate solution may be substituted for the viscose solutions ordinarily used in the manufacture of rayon or cellophane. The usual equipment and technique are employed except for the omission, when my solutions are used, of the step ordinarily used with the viscose solutions to remove sulfur compounds after the precipitation of the dissolved cellulosic material with acid.

The invention will be illustrated in greater detail by the following specific examples of the practice of it.

*Example 1*

Six parts of hydroxyethyl cellulose ether of d. s. 0.5 is slurried with 20 parts of water until the ether is thoroughly wetted. To this slurry are added 22 parts of a sodium zincate solution containing 37% of actual sodium hydroxide and 13% of dissolved zinc oxide. The mix is then stirred thoroughly until the ether dissolves. The result is a thick solution. 52 parts of additional water are then stirred in, to make a total of 100 parts. The solution so made has a viscosity of about 1,000 centipoises.

*Example 2*

Five parts of the ether of Example 1 are slurried with 20 parts of water. Then this slurry is added to a zincate solution made with 22 parts of the above zincate solution of Example 1 and 53 parts of water. The whole mix is agitated for about 10 minutes. A solution similar to that of Example 1 is obtained.

*Example 3*

Five parts of hydroxyethyl ether of d. s. 0.01 is slurried with 20 parts of water and the mix is made as in Example 1 with the exception that the final 52 parts of water are replaced by an equal weight of ice, so that the whole mixture reaches a temperature of 0° C. The cellulose ether dissolves. Upon warming the solution to room temperature a stable solution of cellulose ether is obtained.

*Example 4*

Six parts of methyl ether of d. s. 0.02 is added to 100 parts of a solution containing 8 parts of caustic soda, 2.5 parts of dissolved zinc oxide and enough water to make 100 parts. The whole is mixed thoroughly at room temperature until the ether particles are thoroughly wet. The mass is then cooled to a temperature of 5° C. at which point the ether dissolves to give a homogeneous solution that remains stable at this temperature indefinitely; or the solution may be warmed promptly to room temperature, at which also practically permanent stability is obtained.

*Example 5*

Any procedure of Examples 1 to 4 above is followed with the substitution, for the particular cellulose ether selected in those examples, of equal proportions of any one or a mixture of the following ethers: ethyl, methyl, isopropyl, carboxymethyl, hydroxymethyl, or hydroxyethyl, each of d. s. 0.01 to 0.15 or more. These are examples of lower alkyl ethers of cellulose.

*Example 6*

Treatment of textile material with a solution of cellulose ether in alkali metal zincate is effected as follows:

A fabric is padded at room temperature through a zincate-ether solution prepared as described in any of the Examples 1 to 5 above. The fabric with adhering film of the solution is then passed through a bath containing an excess of a dilute solution of sulfuric acid in water, say 2 to 8% in concentration. The acid precipitates the cellulose ether upon the fabric. The product is then washed and dried.

The fabric may be cotton, rayon, a mixture of these materials containing also acetate or silk, or in some cases, even wool. It may be woven or knitted. In place of fabrics, yarns or threads may be used.

When a protein textile such as wool is used, the contact with the alkali metal zincate solution should be so brief that the fabric is not largely dissolved by the excess alkali present.

*Example 7*

The procedure of Example 6 is repeated except that, after passage through the acid, the fabric is not washed but passed through an aqueous sodium carbonate bath. Insoluble zinc carbonate is precipitated within the coated fabric. The product is then washed to remove the major part of the soluble salts but leave in the coated fabric a large proportion of the zinc compound.

*Example 8*

In a modification, the procedure of Example 6 is followed except that the washing is discontinued short of removal of practically all the zinc and is combined with a subsequent alkali treatment, as with a solution of sodium carbonate, to neutralize remaining acid. This incomplete washing and alkali neutralization leaves in the fabric and coating a substantial total amount of zinc compound.

*Example 9*

A cotton fabric or a yarn is padded through the zincate solution of the ether and is then dried in order to precipitate the cellulose ether. The fabric is then either washed thoroughly, to remove the alkali leaving a large part of the zinc behind as a basic zinc compound or hydroxide, or the fabric is soured in acid to remove the alkali then washed and again dried.

*Example 10*

The ether of Example 3 (d. s. 0.1) is used to treat a cotton fabric by the usual method of padding. After padding on the ether-zincate solution, the solution is then passed through a caustic solution of mercerizing strength (usually about 20 to 30% and preferably about 23%) and finished on any usual mercerizing machine and with usual technique, the cellulose ether being precipitated and fixed on the fabric at the time of passage thru the mercerizing caustic solution. After the mercerization step, the finishing is conventional. It includes washing on a tenter frame, souring and drying.

This method is applicable to any of the cellulose ethers of low degree of substitution as indicated by requiring a temperature substantially below room temperature for dissolving the ether in the zincate solution.

This treatment causes not only mercerization of the fabric but also of the cellulose ether coating. It gives an improved lustre of the finished coated fabric.

*Example 11*

A solution such as that of Example 3 but containing 7.5% of the ether is extruded through the usual rayon spinneret into a bath containing 10% sulfuric acid and 20% sodium sulfate. The filament so produced is then treated and wound onto bobbins as in the manner usual in the manufacture of viscose rayon filament. In general, my solution of the ether in sodium zincate is substituted for the viscose solutions commonly used in making the rayon and is processed in the same manner except for the omission in my process of the steps ordinarily employed to remove sulfur compounds. The product is a filament of regenerated cellulose ether. It is spun with other filaments, to give a thread.

In a modification of this embodiment the spinneret is substituted by the slit orifice used in extruding the solution for cellophane manufacture, the product being a transparent sheet of regenerated cellulose ether.

It will be understood that it is intended to cover all changes and modifications of the examples of the invention herein chosen for the purpose of illustration which do not constitute departures from the spirit and scope of the invention.

What I claim is:

The method of treating a textile material which comprises applying to the textile material a solution of a cellulose ether in an aqueous solution of an alkali metal zincate so as to form a film of solution on the material, precipitating cellulose ether from the said film upon the textile material by applying thereto a solution of sodium hydroxide of mercerizing strength, and washing and drying the product.

SIDNEY M. EDELSTEIN.

REFERENCES CITED

The following references are of record in the file of this patent:

UNITED STATES PATENTS

| Number | Name | Date |
|---|---|---|
| 889,861 | Smith et al. | June 2, 1908 |
| 1,991,809 | Lilienfeld | Feb. 19, 1935 |
| 2,036,424 | Malm | Apr. 7, 1936 |
| 2,038,755 | Nollau | Apr. 28, 1936 |
| 2,129,708 | Schreiber | Sept. 13, 1938 |
| 2,321,270 | Bacon et al. | June 8, 1943 |

FOREIGN PATENTS

| Number | Country | Date |
|---|---|---|
| 462,824 | Great Britain | Mar. 16, 1937 |

Certificate of Correction

Patent No. 2,465,520.  March 29, 1949.

SIDNEY M. EDELSTEIN

It is hereby certified that errors appear in the printed specification of the above numbered patent requiring correction as follows:

Column 1, line 40, for "eithers" read *ethers*; column 4, line 56, for "0.01" read *0.1*; line 67, for "0.02" read *0.2*; column 5, line 12, for "0.01 to 0.15" read *0.1 to 1.5*; and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*